United States Patent [19]

Hoffacker

[11] Patent Number: 5,295,085
[45] Date of Patent: Mar. 15, 1994

[54] PRESSURE MEASUREMENT DEVICE WITH SELECTIVE PRESSURE THRESHOLD CROSSINGS ACCUMULATOR

[75] Inventor: Bud Hoffacker, Woodside, Calif.

[73] Assignee: Avocet, Inc., Palo Alto, Calif.

[21] Appl. No.: 840,842

[22] Filed: Feb. 25, 1992

[51] Int. Cl.[5] .......................... G01L 7/00; G01L 9/00
[52] U.S. Cl. .................................. 364/558; 364/433; 73/384
[58] Field of Search .................. 364/558, 413.31, 433, 364/434; 73/384, 386, 387, 712; 340/626; 377/17, 107

[56] References Cited

U.S. PATENT DOCUMENTS

| | | | |
|---|---|---|---|
| 4,030,065 | 6/1977 | Bateman | 340/27 |
| 4,106,002 | 8/1978 | Hogue, Jr. | 340/626 |
| 4,106,343 | 8/1978 | Cook | 73/387 |
| 4,107,995 | 8/1978 | Ligman et al. | 364/413.31 |
| 4,279,028 | 7/1981 | Lowdenslager et al. | 73/384 X |
| 4,292,671 | 9/1981 | Evans et al. | 364/433 |
| 4,694,694 | 9/1987 | Valkancic et al. | 73/386 |
| 4,969,358 | 11/1990 | Peet, II | 73/384 |
| 5,058,427 | 10/1991 | Brandt | 73/384 |

Primary Examiner—Kevin J. Teska
Assistant Examiner—Eric W. Stamber
Attorney, Agent, or Firm—Limbach & Limbach

[57] ABSTRACT

A pressure measurement device with a selective altitude threshold crossings accumulator and method therefor provides for selective accumulation of relative pressure thresholds. A pressure sensor measures atmospheric pressure and provides analog pressure signals representing measured atmospheric pressures. A digital-to-analog converter converts the analog pressure signals to digital pressure signals for a computer which then computes altitudes corresponding to the measured atmospheric pressures. The computer assigns a threshold flag value which corresponds to the relative direction (e.g. "up" or "down") from a first (e.g. lower) altitude to a second (e.g. higher) altitude when the magnitude of the first-to-second altitude differential exceeds a first threshold. The computer then generates a unit count when both the relative direction from the second altitude to a third (e.g. lower) altitude opposes the first-to-second altitude direction and the magnitude of the second-to-third altitude differential exceeds a second threshold. An accumulator accumulates the unit counts, and the accumulated count is displayed on a display device.

36 Claims, 3 Drawing Sheets

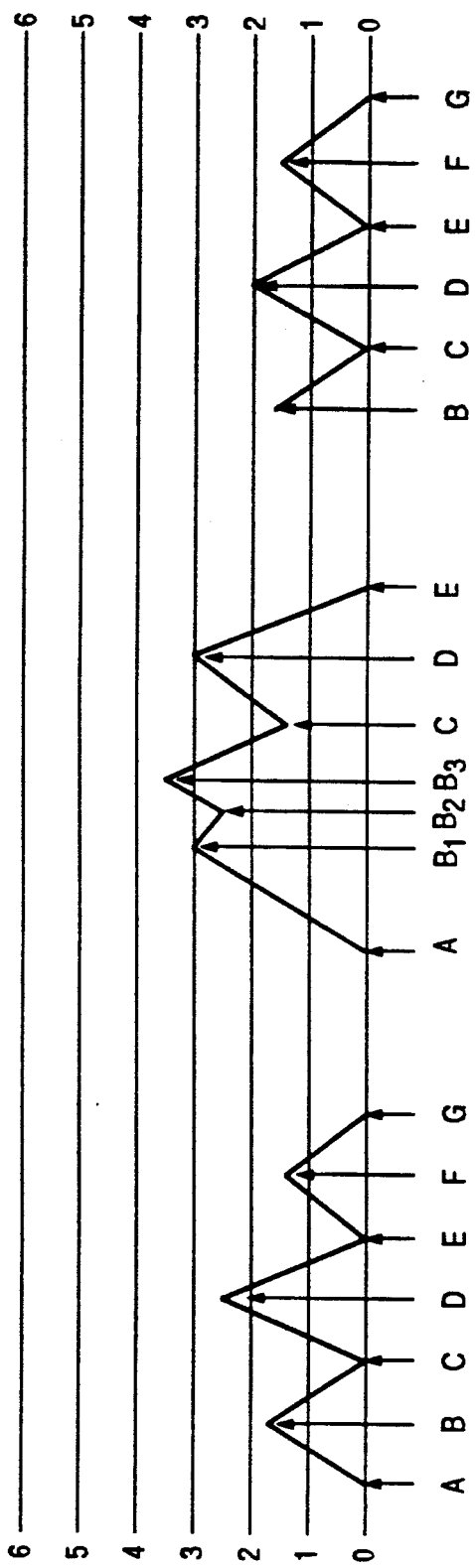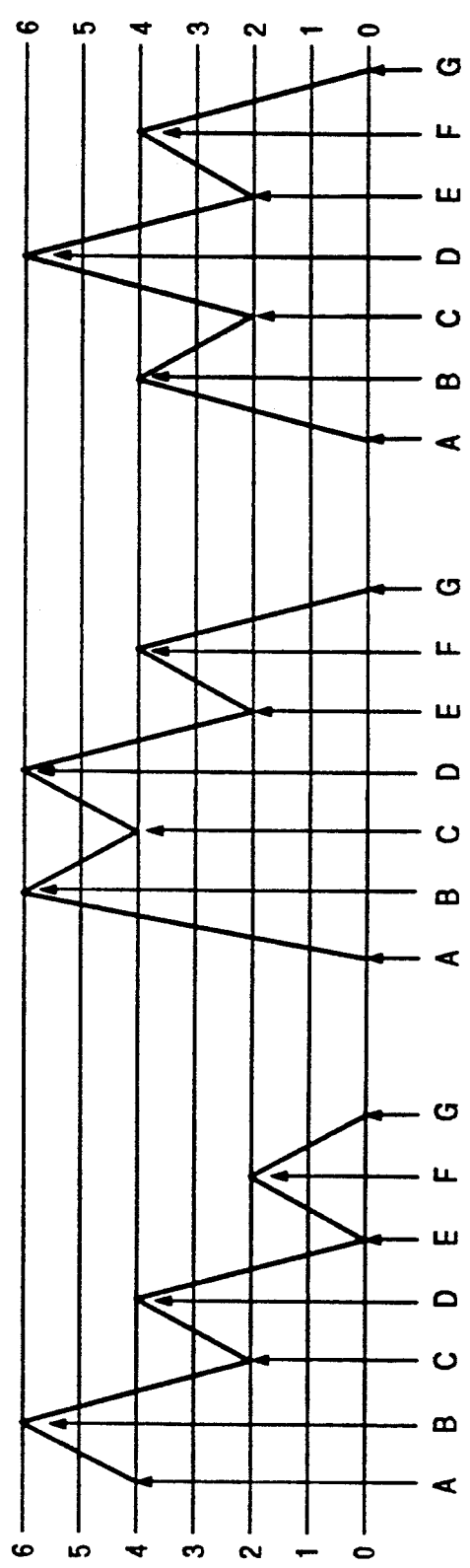

PRESSURE MEASUREMENT DEVICE WITH SELECTIVE PRESSURE THRESHOLD CROSSINGS ACCUMULATOR

BACKGROUND OF THE INVENTION

1. Field of the Invention

The present invention relates to pressure measurement devices, and in particular, to pressure measurement devices which measure and selectively process relative pressure differentials corresponding to opposing pressure thresholds.

2. Description of the Related Art

As the sophistication and costs of solid state pressure measurement devices, such as altimeters, have increased and decreased, respectively, their uses have become varied and widespread. With respect to sports-related activities, various types of accumulating altimeters, in particular, have become popular. For example, U.S. Pat. No. 5,058,427, which is commonly assigned to the assignee of the present invention and the disclosure of which is hereby incorporated by reference, discloses an accumulating altimeter having ascent and descent accumulation thresholds particularly suitable for bicyclists. The altimeter disclosed therein has selective ascent and descent accumulation thresholds which allow the altimeter to initially ignore altitude gains or losses below predetermined amounts, while accounting for altitude gains and losses exceeding such predetermined amounts.

As a further example, U.S. Pat. No. 4,694,694 discloses an altimeter which accumulates and displays altitude gains or losses over selected intervals. As disclosed therein, this type of altimeter can be useful for snow skiers who wish to accumulate total altitude changes during a day of skiing.

While altimeters, and particularly accumulating altimeters, can be useful for many sports-related activities, some activities may require some processed form of altitude information other than a mere accumulation. For example, it would be desireable in some activities to determine not only the present altitude or the cumulative altitude changes, but to also determine how many opposing altitude transitions of a selected magnitude have been encountered.

SUMMARY OF THE INVENTION

A pressure measurement device with a selective pressure threshold crossings accumulator in accordance with the present invention selectively accumulates relative pressure threshold crossings.

In accordance with a preferred embodiment of the present invention, a computer receives a plurality of pressure signals which represent a plurality of atmospheric pressures, and in accordance therewith computes a plurality of altitudes. The computer assigns a threshold flag value which both corresponds to a first altitude vector direction and indicates that a first altitude vector magnitude exceeds a first threshold. The computer further provides a unit count when both a second altitude vector magnitude exceeds a second threshold and a second altitude vector direction opposes the first altitude vector direction. The first altitude vector direction and magnitude represent the direction and magnitude, respectively, of an altitude differential from a first altitude to a second altitude among the plurality of computed altitudes. The second altitude vector direction and magnitude represent the direction and magnitude, respectively, of a second altitude differential from a third altitude to a fourth altitude among the plurality of computed altitudes. An accumulator then receives and accumulates the unit count from the computer.

In accordance with an alternative preferred embodiment of the present invention, a computer receives a plurality of pressure signals representing a plurality of pressures and assigns a threshold flag value which both corresponds to a first pressure vector direction and indicates that a first pressure vector magnitude exceeds a first threshold. The computer further provides a unit count when both a second pressure vector magnitude exceeds a second threshold and a second pressure vector direction opposes the first pressure vector direction. The first pressure vector direction and magnitude represent the sign and magnitude, respectively, of a pressure differential from a first pressure to a second pressure among the plurality of pressures. The second pressure vector direction and magnitude represent the sign and magnitude, respectively, of another pressure differential from a third pressure to a fourth pressure among the plurality of pressures. An accumulator receives and accumulates the unit count from the computer.

In accordance with the foregoing preferred embodiments of the present invention, the computer programmably assigns the threshold flag value when the first vector magnitude exceeds the first threshold, or alternatively, the computer receives a flag assign signal and in accordance therewith assigns the threshold flag value.

These and other objectives, features and advantages of the present invention will be understood upon consideration of the following detailed description of the invention and the accompanying drawings.

BRIEF DESCRIPTION OF THE DRAWINGS

FIGS. 2A-2F graphically represent various exemplary altitude transitions which can be accumulated in accordance with the present invention.

DETAILED DESCRIPTION OF THE INVENTION

Figure 1:
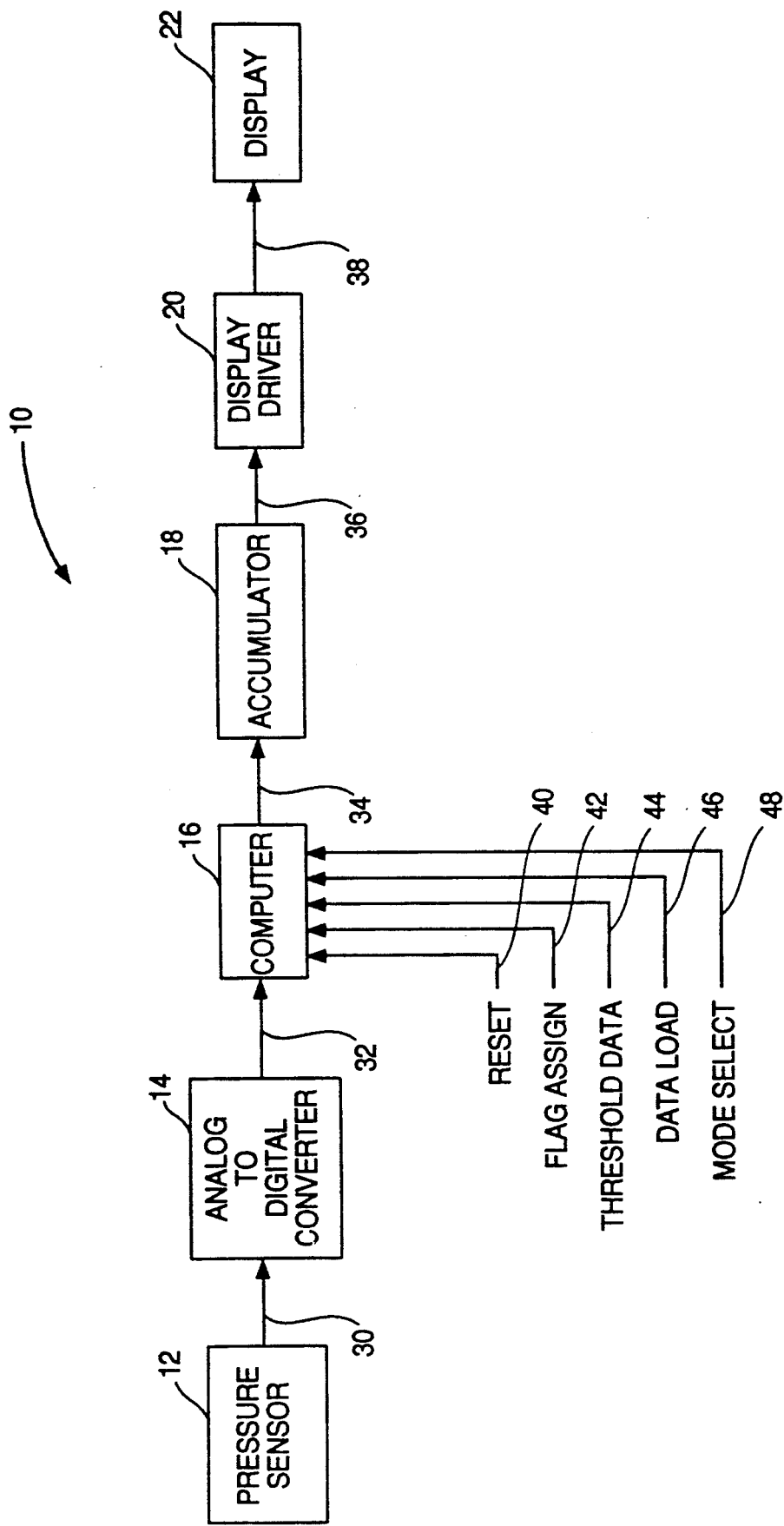
FIG. 1 is a functional block diagram of an altimeter with a selective altitude thresholds accumulator in with the present invention.

Referring to FIG. 1, a preferred embodiment of a pressure measurement device 10 with a selective pressure threshold crossings accumulator in accordance with the present invention includes a pressure sensor 12, analog-to-digital converter ("ADC") 14, computer 16, accumulator 18, display driver 20 and display 22, connected substantially as shown. The pressure sensor 12 can be of any type commonly used for altimeters. Preferably, a solid state pressure sensor, or transducer, such as an integrated circuit having piezoresistors implanted within the semiconductor material, is used for greater sensitivity and reliability.

The pressure sensor 12 typically provides an analog signal 30 which represents the atmospheric pressure as measured by the pressure sensor 12. As is well known in the art, altitude is inversely proportional to atmospheric pressure, and therefore, the analog signal 30 represents the altitude of the pressure sensor 12 in accordance with the measured atmospheric pressure. This analog signal 30 is received by the ADC 14 for conversion into an equivalent digital pressure signal 32 for use by the computer 16.

The computer 16 receives this digital pressure signal 32 and computes the altitude represented by that pressure in accordance with well known mathematical formulas. As discussed more fully below, the computer 16 produces a unit count 34 which is received and accumulated by the accumulator 18.

In an alternative preferred embodiment of the present invention, the computer 16 receives the digital pressure signal 32 and, as discussed more fully below, uses pressure transitions directly in producing the unit count 34, rather than compute altitudes first. Furthermore, a pressure measurement device in accordance with the present invention can be used to accumulate pressure threshold crossings which correspond to pressure transitions, or differentials, involving atmospheric, barometric fluidic or mechanical pressures.

The accumulator 18 provides a unit count accumulation 36 for the display driver 20, which then produces a display signal 38 for driving the display 22 (e.g. liquid crystal display) for viewing by the user. For example, if the altimeter 10 is used by a snow skier, the display 22 can be mounted on the wrist of the skier-user, similar to a wristwatch.

The operation of the computer 16 will now be described in more detail. In addition to the aforementioned digital pressure signal 32, the computer 16 further receives a reset signal 40, flag assign signal 42, threshold data 44, data load signal 46 and a mode select signal 48. When applied, the reset signal 40 resets, or initializes, the computer 16 prior to its beginning operation as discussed hereinbelow.

Based upon the measured atmospheric pressures represented by the incoming pressure signal 32, the computer 16 continuously computes altitudes corresponding thereto. The first altitude so computed is retained as an initial reference, or datum, altitude. As subsequent altitudes are computed, the magnitude of the altitude differential represented by the difference of each subsequent altitude and the reference altitude is compared against a threshold. When an altitude differential magnitude exceeds, or crosses, the threshold, the computer 16 assigns an internal flag value. This flag value corresponds to the relative direction of the altitude change from the reference to the computed, threshold-exceeding altitude.

In an alternative embodiment of the present invention, the computer can receive an external flag assign signal 42, whereupon the internal flag value is assigned immediately (e.g. pre-assigned) without first awaiting a threshold-exceeding altitude transition.

The computer 16 then continues to compute further altitudes. If the altitude changes continue in the same direction, the reference altitude is constantly updated to the current measured altitude. After an altitude maximum (or minimum), or peak, has been measured (i.e. as computed altitudes immediately subsequent thereto begin decreasing [after an altitude maximum] or increasing [after an altitude minimum]), the previously computed altitude maximum (or minimum) is retained as the new reference altitude. Altitude differentials thereafter between subsequent computed altitudes and this new reference altitude are then compared against a second threshold. If and when the second threshold is exceeded, or crossed, the threshold flag value is reassigned and the unit count 34 is generated. Thus, the unit count 34 indicates that opposing altitude transitions, each of which exceeded, or crossed, its corresponding threshold, have been experienced.

However, if the second threshold is not exceeded and the altitude changes reverse in direction, the reference altitude is updated to the current measured altitude when the current measured altitude goes beyond the altitude maximum (or minimum) previously retained as the reference altitude. Hence, unless an altitude change exceeds its associated threshold, opposing altitude changes can extend, or "ratchet," the reference altitude.

As an illustration of the foregoing discussion of the operation of the computer 16, an exemplary use of the present invention would be as an altimeter for a snow skier who wishes to keep track of the number of ski runs completed over a given period of time. For example, at the beginning of the day, the user would reset, or initialize, the computer 16 within the altimeter 10. The user would then proceed up a ski slope via a chair lift to the top of a ski run. Provided that the positive altitude transition, i.e. the gain in altitude via the chair lift, exceeds the first threshold, the computer 16 programmably assigns its internal threshold flag value. After the user skis back down the ski slope, the computer 16 generates the unit count 34, provided that the negative altitude transition, i.e. the altitude loss, exceeded the second threshold. As the unit count 34 continues to be generated, the ski runs represented thereby are counted, i.e. accumulated.

Threshold data 44 representing the thresholds can be inputted to the computer 16 by loading it in accordance with the data load signal 46. The mode select signal 48 determines whether the altitude threshold crossings are accumulated according to "up-then-down" or "down-then-up" altitude transitions.

Referring to FIGS. 2A-2F, several examples of multiple altitude transitions producing various accumulated unit counts 36 will be discussed.

Throughout FIGS. 2A-2F, the horizontal lines numbered "0" through "6" are used to create vertical scales, wherein each scale segment between pairs of horizontal lines represents an altitude differential equal to the first and second thresholds. For the purposes of the examples shown in FIGS. 2A-2F, both thresholds, i.e. the "up" threshold and "down" threshold are equal. In a preferred embodiment of the present invention, both the "up" and "down" thresholds equal 150 feet. However, it should be understood that the thresholds need not be equal.

It should be understood that each altitude transition, e.g. the altitude differential between a reference altitude and a subsequent altitude, can be considered in terms of an altitude vector. As is well known, a vector has both a direction and a magnitude. Thus, each altitude transition, or differential, discussed herein can be thought of in terms of an altitude vector which has an associated vector direction, e.g. up or down, and an associated vector magnitude, e.g. altitude gain or loss.

Referring to FIG. 2A, six altitude transitions are represented having end points A-G as shown. These altitude transitions can represent three complete ski runs accomplished by a snow skier. For example, each of the altitude transitions A-B, C-D and E-F represents an altitude gain experienced by traveling up in a chair lift, while each of the altitude transitions B-C, D-E and F-G represents an altitude loss experienced while skiing down a slope. As can be seen in FIG. 2A, point D represents an altitude peak which is higher than the altitude peaks represented by points B and F. As can be further seen in FIG. 2A, each altitude transition A-B, B-C, C-D, D-E, E-F, F-G exceeds the value of the two thresholds (which in a preferred embodiment are equal). Accordingly, the accumulated unit count 36 for the altitude transitions depicted in FIG. 2A equals three (3).

Referring to FIG. 2B, in accordance with the foregoing discussion, the accumulated unit count for the altitude transitions depicted will be equal to two (2). The A-B1 transition exceeds the first ("up") threshold and therefore causes the computer 16 to assign the threshold flag value and use altitude B1 as the new reference altitude. However, not until downward altitude transition B3-C is the second ("down") threshold exceeded. Further, since altitude transition B1-B2 does not exceed the second threshold, the reference altitude (previously B1) is extended, or "ratcheted," upward to altitude B3. Accordingly, the first unit count 34 does not appear until during the B3-C altitude transition. Following that, in accordance with the foregoing discussion, the altitude transitions C-D and D-E produce the second unit count, with altitudes C and D serving as reference altitudes.

Referring to FIG. 2C, the example depicted illustrates the situation where the user, instead of beginning at Point A, begins at Point B. However, the user wishes to obtain one unit count at Point C, so as to indicate that one ski run has been accomplished. Accordingly, at Point B, the user can manually assign the threshold flag value within the computer 16, e.g. with an externally generated flag assign signal 42. Therefore, upon reaching Point C, i.e. after exceeding the "down" threshold, a unit count 34 is generated. From Point C onward, unit counts 34 are generated and accumulated in accordance with the foregoing discussion. Accordingly, the example in FIG. 2C results in an accumulated count of three (3), just as in FIG. 2A.

Referring to FIGS. 2D-2F, the exemplary altitude transitions depicted, in accordance with the foregoing discussion, all produce accumulated unit counts of three (3).

Figure 3:
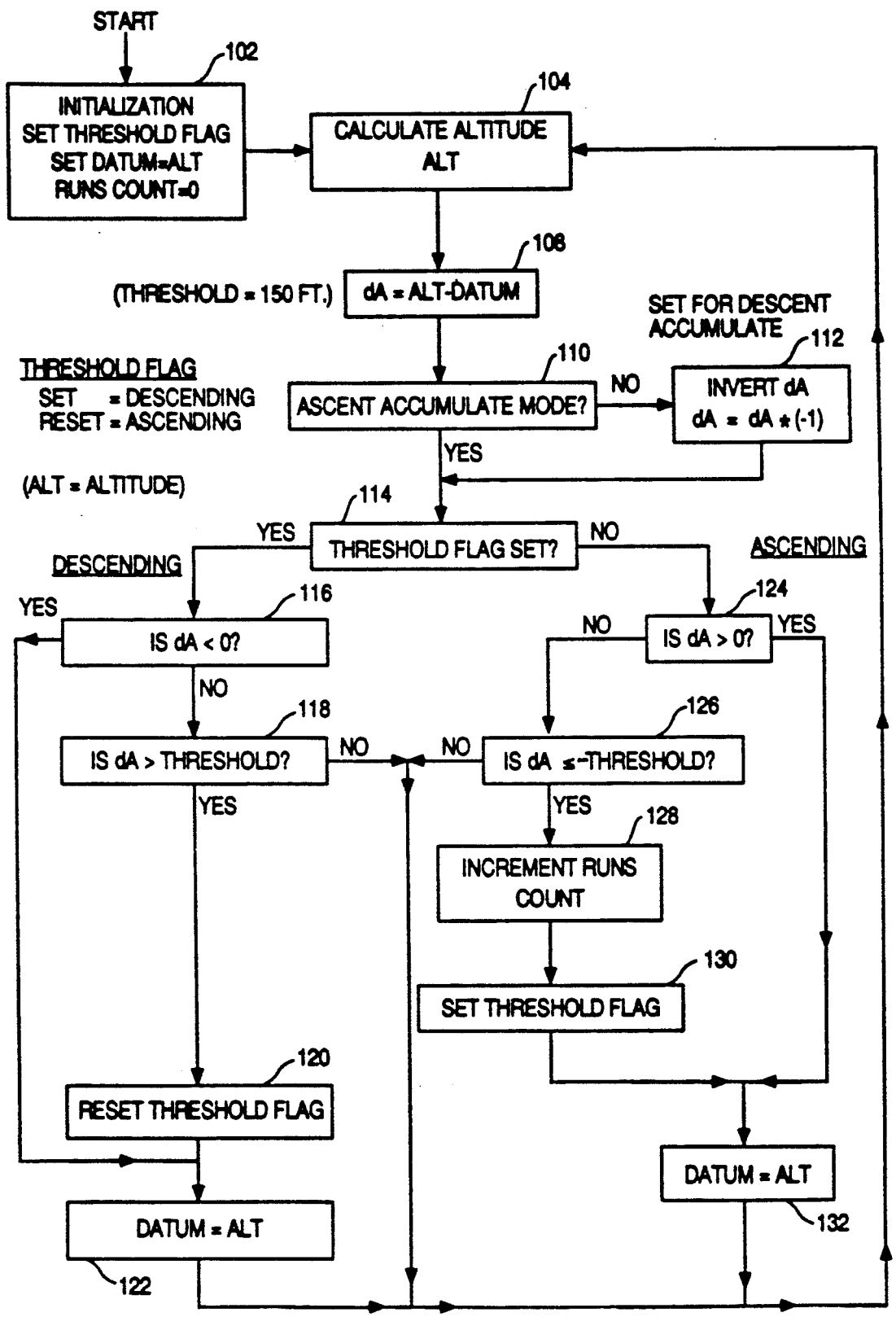
FIG. 3 is a flowchart representing selective altitude thresholds accumulation steps in accordance with the present invention.

Referring to FIG. 3, the operational steps of a pressure measurement device 10 in accordance with the present invention can be better understood. The first step 102 is to initialize the device 10, by setting the threshold flag (e.g. assigning it a value of one, or unity), setting the reference, or datum, altitude equal to the current measured altitude, and setting the "runs count" equal to zero. The next step 104 is to compute the current altitude.

The next step 108 is to compute the difference between the current measured altitude and the datum altitude, followed by the step 110 of determining whether the ascent accumulate mode has been selected. If not, the sign of the altitude differential is inverted (step 112). Thereafter, the next step 114 is to determine whether the threshold flag is set.

If the threshold flag is set, the next step 116 is to determine whether the altitude differential is less than zero, i.e. negative. If it is, operation resumes with step 122 of setting the datum altitude equal to the current altitude. If the altitude differential is not negative, the next step 118 is to determine whether the differential is greater than the threshold. If not, operation resumes with the step 104 of computing the current altitude. If the differential is greater than the threshold, the next step 120 is to reset the threshold flag, followed by the step 122 of resetting the datum altitude equal to the current altitude.

If, after the step 114 of determining whether the threshold flag was set, the threshold flag was not set, the next step 124 is to determine whether the altitude differential is greater than zero, i.e. positive. If it is, the next step 132 is to set the datum altitude equal to the current altitude. If the altitude differential is not positive, the next step 126 is to determine whether the differential is less than the negative value of the threshold. If not, operation resumes with the step 104 of computing the current altitude. If the altitude differential is less than the negative value of the threshold, the next step 128 is to increment the "run count", i.e. accumulate. Following that, the next step 130 is to set the threshold flag, followed further by the step 132 of setting the datum altitude equal to the current altitude.

In accordance with the foregoing discussion, it can be seen that another embodiment of a pressure measurement device in accordance with the present invention can include a computer 16 (FIG. 1) which generates a unit count whenever each of the alternating opposing altitude thresholds is crossed, and an accumulator 18 which accumulates all such unit counts, divides the sum thereof by two, and then truncates or rounds the quotient up or down to the nearest integer value. Such an embodiment could provide a similar (albeit sometimes less precise) accumulation of relative pressure threshold crossings, but without a need for any assignments of flag values.

It should be understood that various alternatives to the embodiments of the present invention described herein can be employed in practicing the present invention. It is intended that the following claims define the scope of the present invention, and that structures and methods within the scope of these claims and their equivalents be covered thereby.

What is claimed is:

1. A pressure threshold crossings accumulator for selectively accumulating relative pressure threshold crossings, comprising:

computer means for receiving a first plurality of pressure signals representing a second plurality of pressures, and for selectively assigning a threshold flag value which both corresponds to a first pressure vector direction and indicates that a first pressure vector magnitude exceeds a first threshold, and further for providing a unit count when both a second pressure vector magnitude exceeds a second threshold and a second pressure vector direction opposes said first pressure vector direction, wherein said first pressure vector direction and magnitude represent a first sign and magnitude, respectively, of a first pressure differential from a first pressure to a second pressure of said second plurality of pressures, and wherein said second pressure vector direction and magnitude represent a second sign and magnitude, respectively, of a second pressure differential from a third pressure to a fourth pressure of said second plurality of pressures; and accumulator means coupled to said computer means for receiving and accumulating said unit count.

2. A pressure threshold crossings accumulator as recited in claim 1, wherein said computer means programmably assigns said threshold flag value when said first pressure vector magnitude exceeds said first threshold.

3. A pressure threshold crossings accumulator as recited in claim 1, wherein said computer means receives a flag assign signal and in accordance therewith assigns said threshold flag value.

4. A pressure threshold crossings accumulator as recited in claim 1, further comprising pressure measuring means coupled to said computer means for measuring pressure and providing said first plurality of pressure signals.

5. A pressure threshold crossings accumulator as recited in claim 1, wherein said first and second thresholds are programmable.

6. An altitude threshold crossings accumulator for selectively accumulating relative altitude threshold crossings, comprising:
computer means for receiving a first plurality of pressure signals representing a second plurality of atmospheric pressures and in accordance therewith computing a third plurality of altitudes, and for selectively assigning a threshold flag value which both corresponds to a first altitude vector direction and indicates that a first altitude vector magnitude exceeds a first threshold, and further for providing a unit count when both a second altitude vector magnitude exceeds a second threshold and a second altitude vector direction opposes said first altitude vector direction, wherein said first altitude vector direction and magnitude represent a first direction and magnitude, respectively, of a first altitude differential from a first altitude to a second altitude of said third plurality of altitudes, and wherein said second altitude vector direction and magnitude represent a second direction and magnitude, respectively, of a second altitude differential from a third altitude to a fourth altitude of said third plurality of altitudes; and
accumulator means coupled to said computer means for receiving and accumulating said unit count.

7. An altitude threshold crossings accumulator as recited in claim 6, wherein said computer means programmably assigns said threshold flag value when said first altitude vector magnitude exceeds said first threshold.

8. An altitude threshold crossings accumulator as recited in claim 6, wherein said computer means receives a flag assign signal and in accordance therewith assigns said threshold flag value.

9. An altitude threshold crossings accumulator as recited in claim 6, further comprising pressure measuring means coupled to said computer means for measuring atmospheric pressure and providing said first plurality of pressure signals.

10. An altitude threshold crossings accumulator as recited in claim 6, wherein said first and second thresholds are programmable.

11. A pressure threshold crossings accumulation method for selectively accumulating relative pressure threshold crossings, comprising the steps of:
receiving a first plurality of pressure signals representing a second plurality of pressures;
selectively assigning a threshold flag value which both corresponds to a first pressure vector direction and indicates that a first pressure vector magnitude exceeds a first threshold, wherein said first pressure vector direction and magnitude represent a first sign and magnitude, respectively, of a first pressure differential from a first pressure to a second pressure of said second plurality of pressures;
providing a unit count when both a second pressure vector magnitude exceeds a second threshold and a second pressure vector direction opposes said first pressure vector direction, wherein said second pressure vector direction and magnitude represent a second sign and magnitude, respectively, of a second pressure differential from a third pressure to a fourth pressure of said second plurality of pressures; and
receiving and accumulating said unit count.

12. A pressure threshold crossings accumulation method as recited in claim 11, wherein said step of selectively assigning said threshold flag value comprises programmably assigning said threshold flag value when said first pressure vector magnitude exceeds said first threshold.

13. A pressure threshold crossings accumulation method as recited in claim 11, wherein said step of selectively assigning said threshold flag value comprises receiving a flag assign signal and in accordance therewith assigning said threshold flag value.

14. A pressure threshold crossings accumulation method as recited in claim 11, further comprising the step of measuring pressure and generating said first plurality of pressure signals.

15. A pressure threshold crossings accumulation method as recited in claim 11, further comprising the step of programmably establishing said first and second thresholds.

16. An altitude threshold crossings accumulation method for selectively accumulating relative altitude threshold crossings, comprising the steps of:
receiving a first plurality of pressure signals representing a second plurality of atmospheric pressures and in accordance therewith computing a third plurality of altitudes;
selectively assigning a threshold flag value which both corresponds to a first altitude vector direction and indicates that a first altitude vector magnitude exceeds a first threshold, wherein said first altitude vector direction and magnitude represent a first direction and magnitude, respectively, of a first altitude differential from a first altitude to a second altitude to a second altitude of said third plurality of altitudes;
providing a unit count when both a second altitude vector magnitude exceeds a second threshold and a second altitude vector direction opposes said first altitude vector direction, wherein said second altitude vector direction and magnitude represent a second direction and magnitude, respectively, of a second altitude differential from a third altitude to a fourth altitude of said third plurality of altitudes; and
receiving and accumulating said unit count.

17. An altitude threshold crossings accumulation method as recited in claim 16, wherein said step of selectively assigning said threshold flag value comprises programmably assigning said threshold flag value when said first altitude vector magnitude exceeds said first threshold.

18. An altitude threshold crossings accumulation method as recited in claim 16, wherein said step of selectively assigning said threshold flag value comprises receiving a flag assign signal and in accordance therewith assigning said threshold flag value.

19. An altitude threshold crossings accumulation method as recited in claim 16, further comprising the step of measuring atmospheric pressure and generating said first plurality of pressure signals.

20. An altitude threshold crossings accumulation method as recited in claim 16, further comprising the step of programmably establishing said first and second thresholds.

21. A pressure threshold crossings accumulator for accumulating relative pressure threshold crossings, comprising:

computer means for receiving a first plurality of pressure signals representing a second plurality of pressures, and for providing a first unit count when a first pressure vector magnitude in a first pressure vector direction exceeds a first threshold, and further for providing a second unit count when both a second pressure vector magnitude exceeds a second threshold and a second pressure vector direction opposes said first pressure vector direction, wherein said first pressure vector direction and magnitude represent a first sign and magnitude, respectively, of a first pressure differential from a first pressure to a second pressure of said second plurality of pressures, and wherein said second pressure vector direction and magnitude represent a second sign and magnitude, respectively, of a second pressure differential from a third pressure to a fourth pressure of said second plurality of pressures; and accumulator means coupled to said computer means for receiving and selectively accumulating said first and second unit counts.

22. A pressure threshold crossings accumulator as recited in claim 21, wherein said accumulator means adds said first and second unit counts to produce a unit count sum and divides said unit count sum by two.

23. A pressure threshold crossings accumulator as recited in claim 21, further comprising pressure measuring means coupled to said computer means for measuring pressure and providing said first plurality of pressure signals.

24. A pressure threshold crossings accumulator as recited in claim 21, wherein said first and second thresholds are programmable.

25. An altitude threshold crossings accumulator for accumulating relative altitude threshold crossings, comprising:

computer means for receiving a first plurality of pressure signals representing a second plurality of atmospheric pressures and in accordance therewith computing a third plurality of altitudes, and for providing a first unit count when a first altitude vector magnitude in a first altitude vector direction exceeds a first threshold, and further for providing a second unit count when both a second altitude vector magnitude exceeds a second threshold and a second altitude vector direction opposes said first altitude vector direction, wherein said first altitude vector direction and magnitude represent a first direction and magnitude, respectively, of a first altitude differential from a first altitude to a second altitude of said third plurality of altitudes, and wherein said second altitude vector direction and magnitude represent a second direction and magnitude, respectively, of a second altitude differential from a third altitude to a fourth altitude of said third plurality of altitudes; and accumulator means coupled to said computer means for receiving and selectively accumulating said first and second unit counts.

26. An altitude threshold crossings accumulator as recited in claim 25, wherein said accumulator means adds said first and second unit counts to produce a unit count sum and divides said unit count sum by two.

27. An altitude threshold crossings accumulator as recited in claim 25, further comprising pressure measuring means coupled to said computer means for measuring atmospheric pressure and providing said first plurality of pressure signals.

28. An altitude threshold crossings accumulator as recited in claim 25, wherein said first and second thresholds are programmable.

29. A pressure threshold crossings accumulation method for accumulating relative pressure threshold crossings, comprising the steps of:

receiving a first plurality of pressure signals representing a second plurality of pressures;

providing a first unit count when a first pressure vector magnitude in a first pressure vector direction exceeds a first threshold, wherein said first pressure vector direction and magnitude represent a first sign and magnitude, respectively, of a first pressure differential from a first pressure to a second pressure of said second plurality of pressures;

providing a second unit count when both a second pressure vector magnitude exceeds a second threshold and a second pressure vector direction opposes said first pressure vector direction, wherein said second pressure vector direction and magnitude represent a second sign and magnitude, respectively, of a second pressure differential from a third pressure to a fourth pressure of said second plurality of pressures; and receiving and selectively accumulating said first and second unit counts.

30. A pressure threshold crossings accumulation method as recited in claim 29, wherein said step of receiving and selectively accumulating said first and second unit counts comprises adding said first and second unit counts to produce a unit count sum and dividing said unit count sum by two.

31. A pressure threshold crossings accumulation method as recited in claim 29, further comprising the step of measuring pressure and generating said first plurality of pressure signals.

32. A pressure threshold crossings accumulation method as recited in claim 29, further comprising the step of programmably establishing said first and second thresholds.

33. An altitude threshold crossings accumulation method for accumulating relative altitude threshold crossings, comprising the steps of:

receiving a first plurality of pressure signals representing a second plurality of atmospheric pressures and in accordance therewith computing a third plurality of altitudes;

providing a first unit count when a first altitude vector magnitude in a first altitude vector direction exceeds a first threshold, wherein said first altitude vector direction and magnitude represent a first direction and magnitude, respectively, of a first altitude differential from a first altitude to a second altitude of said third plurality of altitudes;

providing a second unit count when both a second altitude vector magnitude exceeds a second threshold and a second altitude vector direction opposes said first altitude vector direction, wherein said second altitude vector direction and magnitude represent a second direction and magnitude, respectively, of a second altitude differential from a third altitude to a fourth altitude of said third plurality of altitudes; and receiving and selectively accumulating said first and second unit counts.

34. An altitude threshold crossings accumulation method as recited in claim 33, wherein said step of receiving and selectively accumulating said first and second unit counts comprises adding said first and second unit counts to produce a unit count sum and dividing said unit count sum by two.

35. An altitude threshold crossings accumulation method as recited in claim 33, further comprising the step of measuring atmospheric pressure and generating said first plurality of pressure signals.

36. An altitude threshold crossings accumulation method as recited in claim 33, further comprising the step of programmably establishing said first and second thresholds.

* * * * *